(12) United States Patent
Samsudin et al.

(10) Patent No.: US 11,112,683 B1
(45) Date of Patent: Sep. 7, 2021

(54) CAMERA WITH INFRARED MODULE

(71) Applicant: MOTOROLA SOLUTIONS, INC., Chicago, IL (US)

(72) Inventors: Imadi Safwan Samsudin, Kedah (MY); Seng Huan Chuah, Penang (MY); Christopher Okrainetz, Vancouver (CA); Ban Hin Ooi, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/001,172

(22) Filed: Aug. 24, 2020

(51) Int. Cl.
| | |
|---|---|
| *G03B 17/56* | (2021.01) |
| *G03B 5/02* | (2021.01) |
| *G03B 5/04* | (2021.01) |
| *H04N 7/18* | (2006.01) |
| *H04N 5/225* | (2006.01) |
| *G03B 15/03* | (2021.01) |

(52) U.S. Cl.
CPC ............ *G03B 17/561* (2013.01); *G03B 5/02* (2013.01); *G03B 5/04* (2013.01); *G03B 15/03* (2013.01); *H04N 5/2252* (2013.01); *H04N 5/2253* (2013.01); *H04N 5/2256* (2013.01); *H04N 7/183* (2013.01)

(58) Field of Classification Search
None
See application file for complete search history.

(56) References Cited

U.S. PATENT DOCUMENTS 5,473,368 A * 12/1995 Hart .................. G08B 13/1963
348/155
2008/0122927 A1* 5/2008 Konno ................ H04N 5/2256
348/143
2009/0284596 A1* 11/2009 Lin ...................... H04N 5/2259
348/143
2011/0158637 A1* 6/2011 Jung ...................... G03B 15/03
396/535
2011/0199482 A1* 8/2011 Morgan ............. H04N 5/23299
348/143
2013/0169805 A1* 7/2013 Park ..................... H04N 5/2256
348/143
2015/0077614 A1* 3/2015 King .................... H04N 5/2256
348/311
2017/0363932 A1* 12/2017 Lim ........................ G03B 17/02
2019/0068892 A1* 2/2019 Yasutake ................ H04N 5/247

FOREIGN PATENT DOCUMENTS

| KR | 20100130703 A | 12/2010 |
|---|---|---|
| KR | 20180066842 A | 6/2018 |
| WO | 2008017857 A1 | 2/2008 |

* cited by examiner

*Primary Examiner* — William B Perkey
(74) *Attorney, Agent, or Firm* — Michael Best & Friedrich LLP

(57) ABSTRACT

A camera includes an optical camera housing, and a platform disposed at least partially within the optical camera housing. The platform is configured to be pan-rotated about a first axis relative to the optical camera housing. The platform includes a first component configured to be coupled to a camera lens, and a second component having a mount configured to be fixed to an infrared module. The camera also includes a camera lens coupled to the first component of the platform. The camera lens is configured to tilt relative to the platform about a second axis different from the first axis. The camera also includes an infrared module fixed to the mount.

20 Claims, 5 Drawing Sheets

CAMERA WITH INFRARED MODULE

BACKGROUND OF THE INVENTION

Closed circuit television (CCTV) cameras often use infrared light to provide night-time illumination and vision. The closed circuit television cameras include a plurality of infrared modules that are fixed in place, and are positioned around the camera to provide the infrared light for different panning angles.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
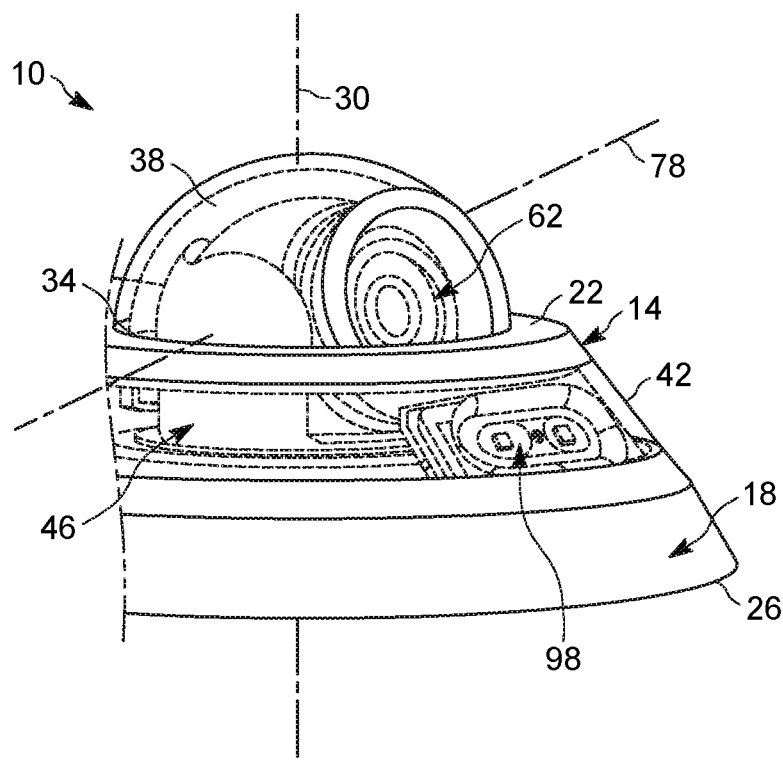
FIG. 1 is a perspective view of a camera in accordance with one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, closed circuit television cameras often use a plurality of fixed infrared modules spaced around the camera to provide infrared light. However, using a plurality of infrared modules around the camera is costly, consumes a high amount of power, and otherwise adds complexity to the camera. Accordingly, there is a need for an improved camera that provides, among other things, a reduced number of infrared modules.

Briefly, there is provided herein an improved camera. The camera, according to one embodiment, includes an optical camera housing, and a platform disposed at least partially within the optical camera housing. The platform is configured to be pan-rotated about a first axis relative to the optical camera housing. The platform includes a first component configured to be coupled to a camera lens, and a second component having a mount configured to be fixed to an infrared module. The camera also includes a camera lens coupled to the first component of the platform. The camera lens is configured to tilt relative to the platform about a second axis different from the first axis. The camera also includes an infrared module fixed to the mount.

FIG. 1 illustrates a camera 10. Some embodiments of the camera 10 include features that particularly are useful for closed circuit television implementations. However, the camera 10 may be used for other monitoring or image-capturing purposes. For example, the camera 10 may be used to monitor the exterior of a building, the interior of a building, an environment away from a building, and the like. Additionally, in some embodiments the camera 10 may be a public use camera, and may transmit signals which are publicly, rather than privately, distributed.

In the embodiment illustrated in FIG. 1, the camera 10 includes an optical camera housing 14. The optical camera housing 14 includes a body 18 having a first end 22 and a second end 26 spaced apart from the first end 22 along a first axis 30. In the illustrated embodiment, the body 18 is tapered along the first axis 30, such that the second end 26 has a larger diameter than the first end 22. Other embodiments include different shapes for a body 18 than that illustrated.

With continued reference to FIG. 1, the first end 22 defines an opening 34. The optical camera housing 14 includes a first window 38 that is coupled to the first end 22 of the body 18 and extends away from the opening 34 along the first axis 30. The first window 38 is transparent, and has a dome shape. Other embodiments include a first window 38 having a different shape and/or orientation than that illustrated, as well as a different location for the first window 38 than that illustrated.

As illustrated in FIG. 1, the optical camera housing 14 also includes a second window 42 spaced apart from the first window 38. The second window 42 extends circumferentially at least partially (for example up to and including 360 degrees) around the body 18 of the optical camera housing 14. The second window 42 is transparent, and is inclined at an oblique angle relative to the first axis 30 due to the tapered shape of the body 18. Other embodiments include a second window 42 having a different shape and/or orientation than that illustrated, as well as a different location for the second window 42 than that illustrated.

Figure 2:
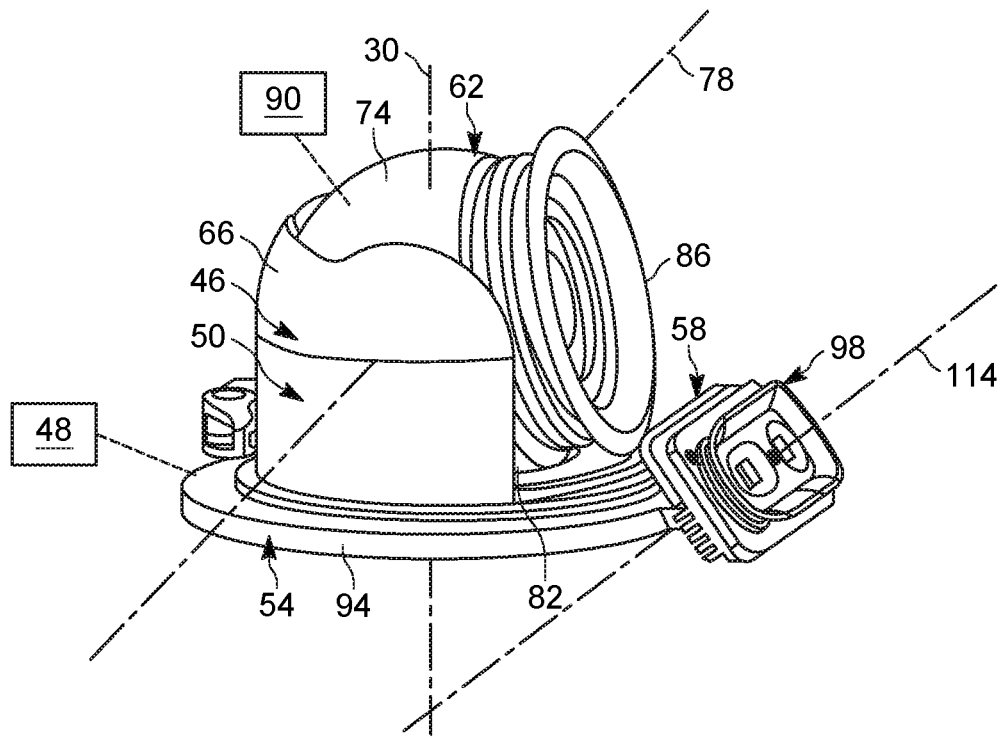
FIG. 2 is a perspective view of a portion of the camera of FIG. 1.
Figure 3:
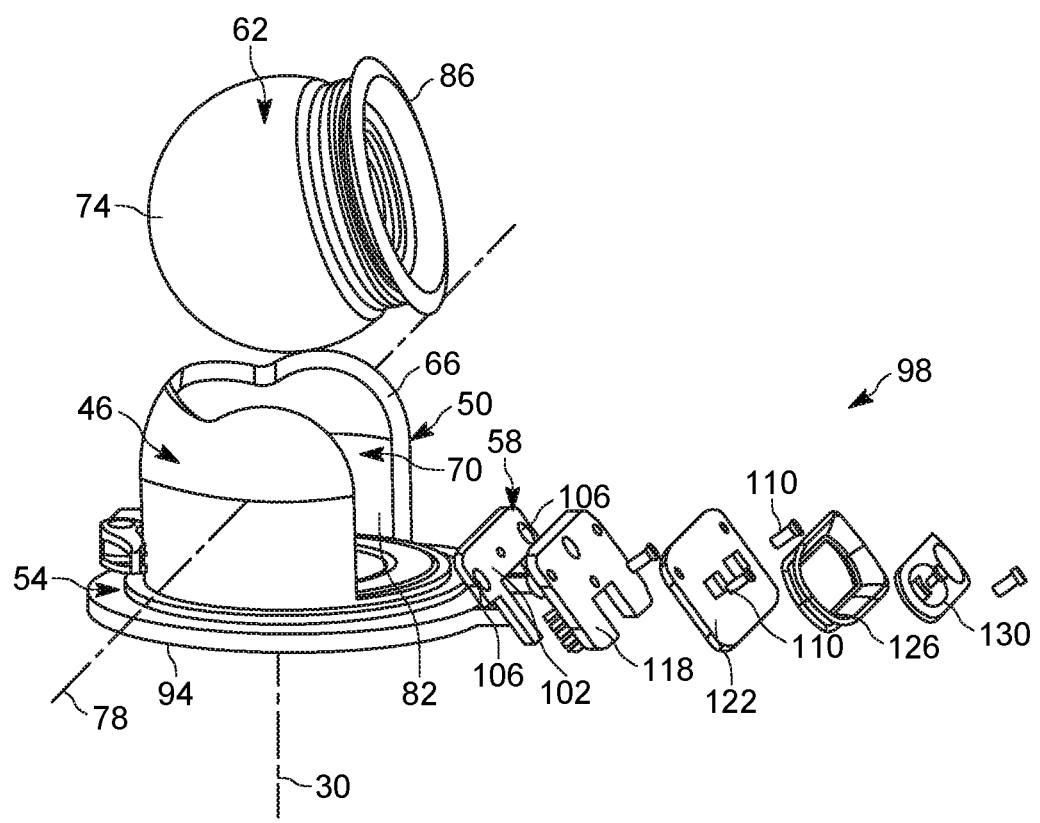
FIG. 3 is an exploded perspective view of the portion of the camera illustrated in FIG. 2.
Figure 4A:
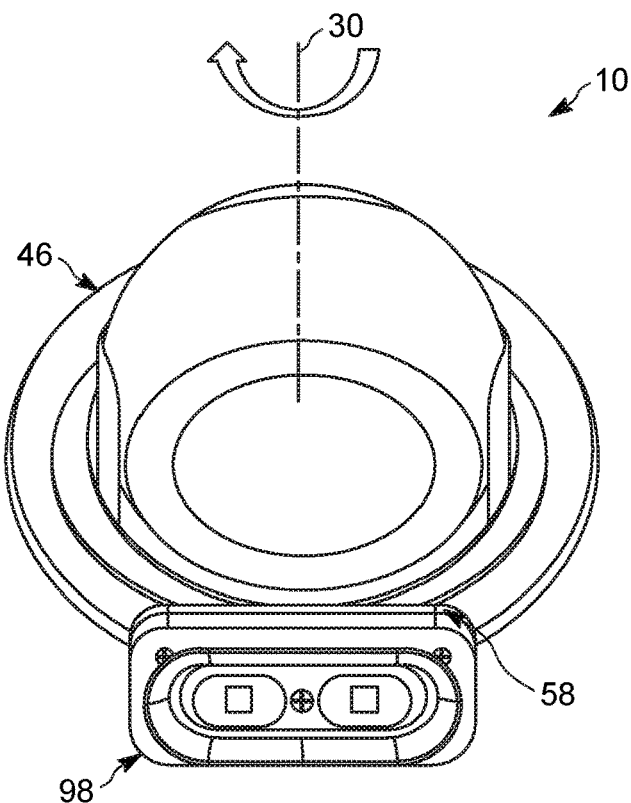
FIGS. 4A, 4B, 4C, and 4D are perspective views of the camera of FIG. 1, illustrating various panning angles.
Figure 4B:
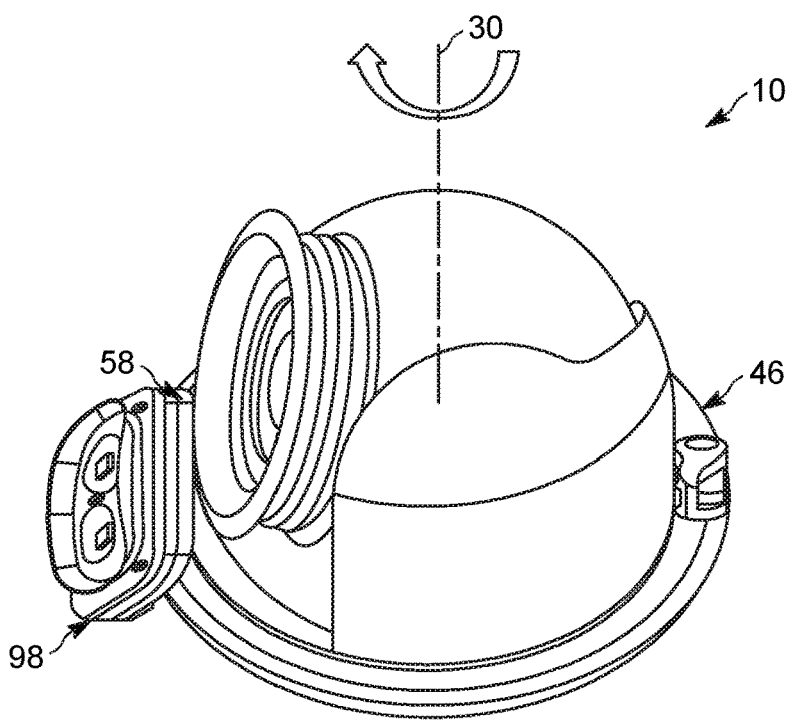
Figure 4C:
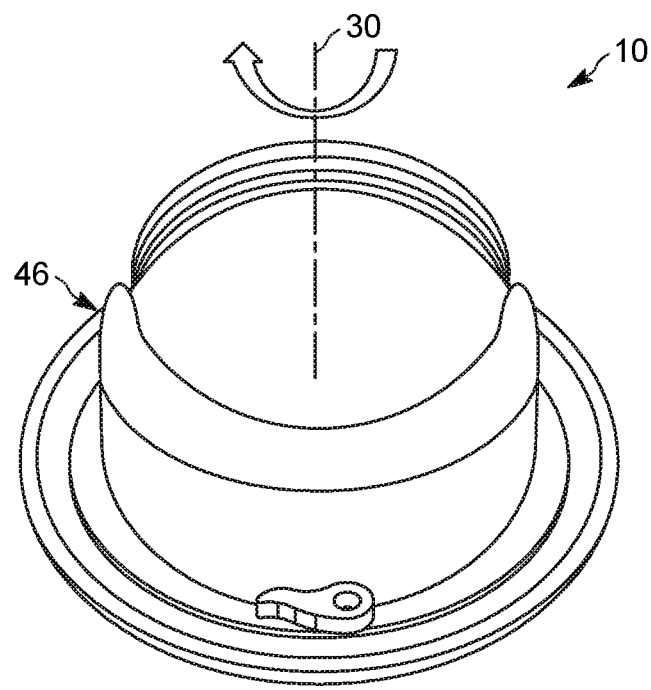
Figure 4D:
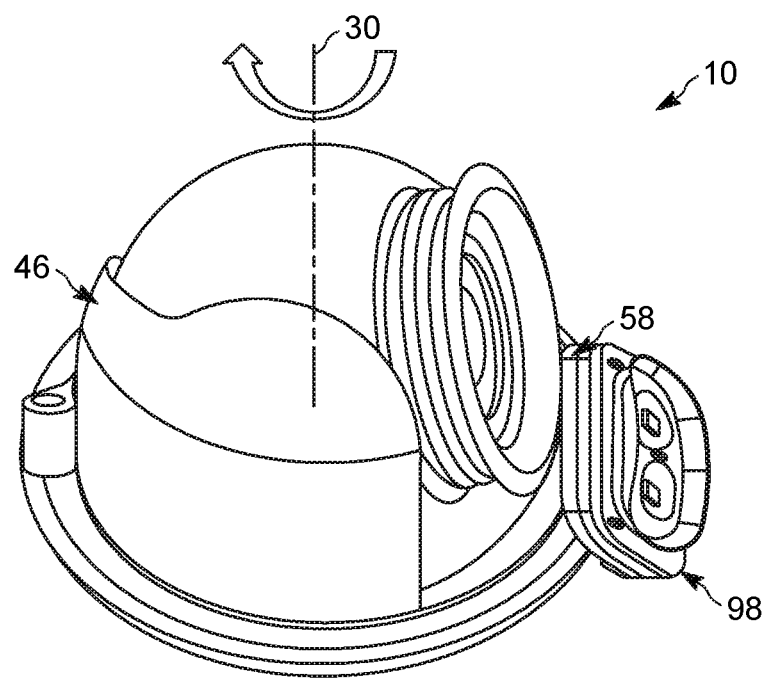

With reference to FIGS. 1-3, the camera 10 includes a platform 46 that pan-rotates relative to the optical camera housing 14 about the first axis 30. The platform 46 is disposed at least partially within the optical camera housing 14, and is coupled to a motor 48 (for example an electric motor, illustrated schematically in FIG. 2) that is used to cause the pan-rotation. The motor 48 may be located for example within the optical camera housing 14 or may be positioned outside of the optical camera housing 14.

In some embodiments, the platform 46 may be rotated continuously in one direction about the first axis 30. In other embodiments, the platform 46 may be rotated in a first direction about the first axis 30 and may also be reversed to rotate in an opposite direction about the first axis 30. As illustrated in FIGS. 2 and 3, the platform 46 includes a first component 50 and a second component 54 that is coupled (for example integrally formed as a single piece with) the first component 50. The second component 54 includes a mount 58.

With reference to FIGS. 1-3, the camera 10 includes a camera lens 62 that is coupled to the first component 50. In the illustrated embodiment the first component 50 includes a U-shaped, curved wall 66 that defines an interior space 70 (FIG. 3) sized and shaped to receive a portion of the camera lens 62. In an assembled state (FIG. 2), the camera lens 62 includes a spherical portion 74 that is disposed (for example nested) at least partially within the interior space 70.

With continued reference to FIGS. 2 and 3, the camera lens 62 tilts within the interior space 70 about a second axis 78. In the illustrated embodiment the U-shaped, curved wall 66 defines an opening 82 (a portion of which extends along a direction that is parallel to the first axis 30). The spherical portion 74 of the camera lens 62 is nested within the interior space 70 (for example such that the spherical portion 74 is free to rotate within the interior space 70), whereas another, leading portion 86 of the camera lens 62 is disposed outside of the opening 82. The leading portion 86 is wider than the opening 82, limiting movement of the camera lens 62 about the second axis 78 as the camera lens 62 is tilted and the spherical portion 74 rotates. Other embodiments do not include the opening 82, and/or have a wall 66 that includes a different shape than that illustrated. Additionally, in other embodiments the camera lens 62 is pivotally coupled to the first component 50 with trunnions, with a pin or pins, or via other structures. As illustrated in FIG. 2, the camera 10 may include a motor 90 (for example a motor separate from the motor 48, as illustrated schematically in FIG. 2) to tilt the camera lens 62 about the second axis 78 and to position the camera lens 62 relative to the second axis 78. In other embodiments the camera lens 62 may be tilted manually and/or may be mechanically locked into different tilt positions relative to the second axis 78.

With continued reference to FIGS. 2 and 3, the second component 54 of the platform 46 includes a base structure 94 that extends circumferentially around the first component 50. As illustrated in FIG. 3, the first component 50 of the platform 46 extends axially away from the base structure 94 along the first axis 30, and the mount 58 of the second component 54 extends radially away from the base structure 94. When fully assembled (FIG. 1), the mount 58 remains radially inward of the second window 42. The base structure 94 has a ring shape, although other embodiments include different shapes than that illustrated.

As illustrated in FIGS. 2-4, the camera 10 includes an infrared module 98 that is fixed to the mount 58. In the illustrated embodiment, the mount 58 includes a planar surface 102 (FIG. 3) having apertures 106 (for example, threaded apertures). The infrared module 98 is fixed to this planar surface 102 via fasteners 110 that extend at least partially through the infrared module 98 and into the apertures 106. In other embodiments, the number and arrangement of apertures 106 and fasteners 110 is different than that illustrated. In some embodiments, the infrared module 98 is fixed to the mount 58 via adhesive, clips, or structures other than the fasteners 110. Additionally, in other embodiments the mount 58 has a different shape or size than that illustrated, and/or has a different (for example non-planar) surface to which the infrared module 98 is fixed.

With reference to FIG. 2, in the illustrated embodiment a third axis 114 passes through the infrared module 98 and the mount 58 and extends perpendicular to the planar surface 102 of the mount 58. The third axis 114 is oriented at an oblique angle relative to the first axis 30 (for example, between 40 and 50 degrees, between 30 and 60 degrees, or other values and ranges). As illustrated in FIG. 2, both the second axis 78 and the third axis 114 each intersect the first axis 30, and the second axis 78 is perpendicular to the first axis 30. In other embodiments the second axis 78 may extend at an oblique angle relative to the first axis 30, and/or the second axis 78 and/or third axis 114 may not intersect the first axis 30.

With reference to FIG. 3, in the illustrated embodiment the infrared module 98 includes a heat sink 118, a printed circuit board assembly 122, a gasket 126, and a light guide 130. The heat sink 118 is disposed between the mount 58 and the printed circuit board assembly 122, and the printed circuit board assembly 122 is disposed between the heat sink 118 and the light guide 130. Other embodiments include different numbers, types, and arrangements of components for the infrared module 98 than that illustrated. For example, in some embodiments the infrared module 98 does not include a heat sink 118 and/or gasket 126.

In the embodiment illustrated in FIGS. 4A-D, the infrared module 98 is the only infrared module 98 coupled to the platform 46. As the platform 46 is pan-rotated about the first axis 30, the single infrared module 98 rotates with the platform 46 about the first axis 30 and remains fixed relative to the platform 46. FIGS. 4A-D illustrates various panning angles as the platform 46 is rotated 360 degrees about the first axis 360. The panning angles are 90 degrees apart. In the illustrated embodiment, the infrared module 98 is positioned adjacent the opening 82 on the platform 46, such that the infrared module 98 always remains adjacent the opening 82 as the platform 46 is rotated about the first axis 30. In other embodiments the single infrared module 98 may be positioned at a different location along the platform 46 than that illustrated. Additionally, and as noted above, the camera lens 62 may separately tilt about the second axis 78. The tilting of the camera lens 62 about the second axis 78 is independent of the position of the platform 46 and of the single infrared module 98 that is fixed to the platform 46.

Figure 5:
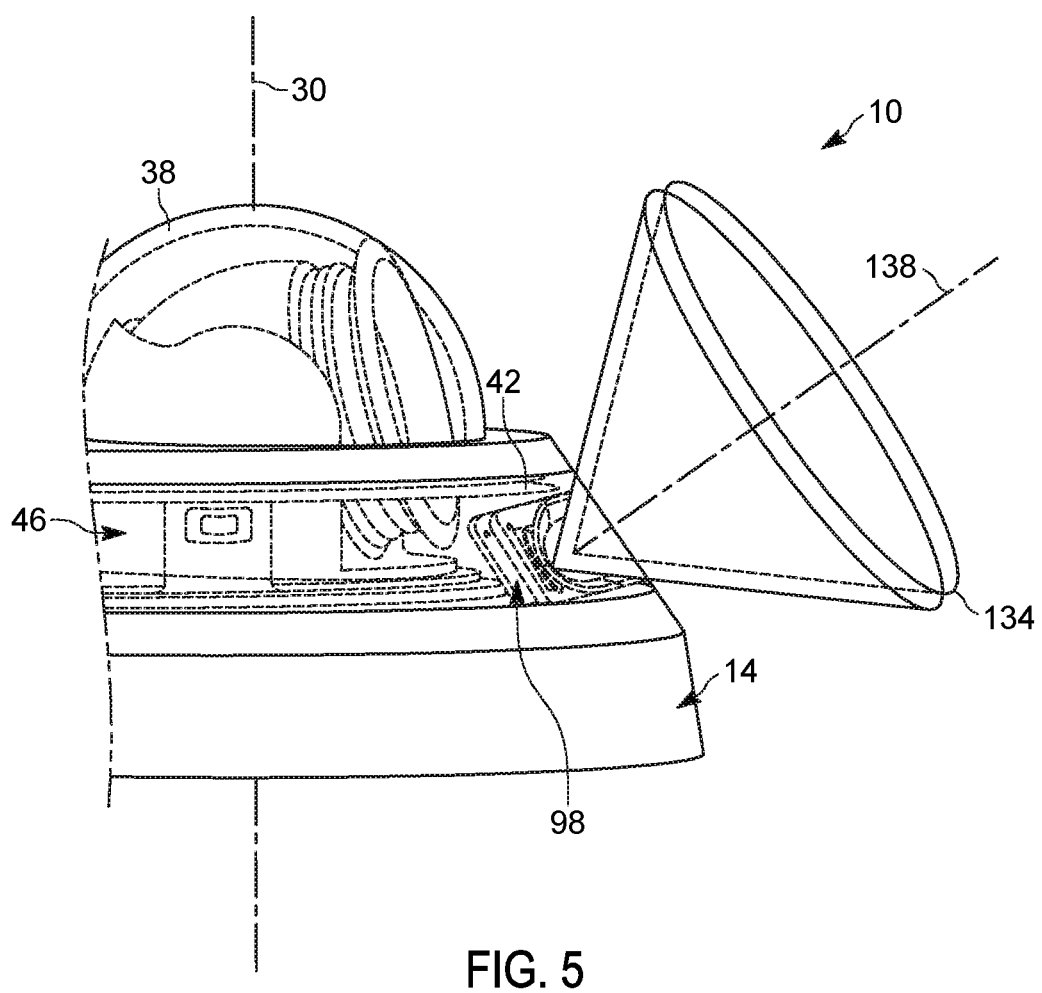
FIG. 5 is a perspective view of the camera of FIG. 1, illustrating a cone of infrared light emitted from the camera.

During use of the camera 10, the camera lens 62 receives light through the first window 38, and the infrared module 98 emits infrared light out of the second window 42. For example, and with reference to FIG. 5. the infrared module 98 emits a cone 134 of infrared light through the second window 42 and away from the first axis 30. The cone 134 is defined by a central cone axis 138. The central cone axis 138 extends at an oblique angle relative to the first axis 30 (for example between 40 and 50 degrees, between 30 and 60 degrees, or other values and ranges). In some embodiments, the central cone axis 138 is identical to the third axis 114 described above.

By using only a single infrared module 98 that rotates with the platform 46 (as opposed to using a plurality of fixed infrared modules), the infrared module 98 may be used for all panning angles of the camera 10. The camera 10 may thus be less costly, consume a lower amount of power, and/or otherwise have less complexity than traditional cameras described above that require multiple infrared modules.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A camera comprising:
an optical camera housing;
a platform disposed at least partially within the optical camera housing, wherein the platform is configured to be pan-rotated about a first axis relative to the optical camera housing, wherein the platform includes a first component configured to be coupled to a camera lens, and a second component having a mount configured to be fixed to an infrared module;
a camera lens coupled to the first component of the platform, wherein the camera lens is configured to tilt relative to the platform about a second axis different from the first axis; and
an infrared module fixed to the mount.

2. The camera of claim 1, wherein the first axis extends through the first component of the platform, and wherein the mount is spaced radially away from the first axis and from the first component of the platform.

3. The camera of claim 1, wherein the second component of the platform includes a base structure that extends circumferentially around the first component of the platform, and wherein the mount extends radially away from the base structure.

4. The camera of claim 3, wherein the first component of the platform extends axially away from the base structure along the first axis.

5. The camera of claim 1, wherein the mount includes a planar surface, and wherein the infrared module is fixed to the planar surface.

6. The camera of claim 5, wherein a third axis extends perpendicular to the planar surface, wherein the third axis is oriented at an oblique angle relative to the first axis.

7. The camera of claim 6, wherein both the second axis and the third axis each intersect the first axis, and wherein the second axis is perpendicular to the first axis.

8. The camera of claim 1, wherein the infrared module is configured to emit a cone of infrared light away from the first axis, wherein the cone is defined by a central cone axis, and wherein the central cone axis extends at an oblique angle relative to the first axis.

9. The camera of claim 1, wherein the first component of the platform defines an interior space configured to receive the camera lens, and wherein the camera lens is disposed at least partially within the interior space and is configured to tilt within the interior space about the second axis.

10. The camera of claim 9, wherein the first component of the platform includes a U-shaped, curved wall that defines the interior space, and wherein the camera lens includes a spherical portion disposed at least partially within the interior space.

11. The camera of claim 1, wherein the infrared module is the only infrared module coupled to the platform.

12. The camera of claim 1, wherein the mount includes a threaded aperture, and wherein the infrared module includes a fastener extending through at least a portion of the infrared module and into the threaded aperture.

13. The camera of claim 12, wherein the infrared module includes a heat sink, a printed circuit board assembly, and a light guide, wherein the heat sink is disposed between the mount and the printed circuit board assembly, and wherein the printed circuit board assembly is disposed between the heat sink and the light guide.

14. The camera of claim 1, wherein the optical camera housing includes a first window and a second window spaced apart from the first window.

15. The camera of claim 14, wherein the camera lens is configured to receive light through the first window, and wherein the infrared module is configured to emit infrared light out of the second window.

16. The camera of claim 14, wherein the first axis extends through the first window.

17. The camera of claim 14, wherein the first window has a dome shape, and wherein the second window extends circumferentially around the optical camera housing.

18. The camera of claim 14, wherein the second component of the platform includes a base structure that extends circumferentially around the first component of the platform, and wherein the mount extends radially away from the base structure and is disposed radially inward of the second window.

19. The camera of claim 18, wherein the first component of the platform extends axially away from the base structure along the first axis.

20. The camera of claim 19, wherein the infrared module is configured to emit a cone of infrared light away from the first axis, wherein the cone is defined by a central cone axis, and wherein the central cone axis extends at an oblique angle relative to the first axis.

* * * * *